Jan. 16, 1934.  J. H. DELANEY  1,943,757
SOUNDPROOF BOARD AND PROCESS OF MAKING SAME
Filed May 13, 1930
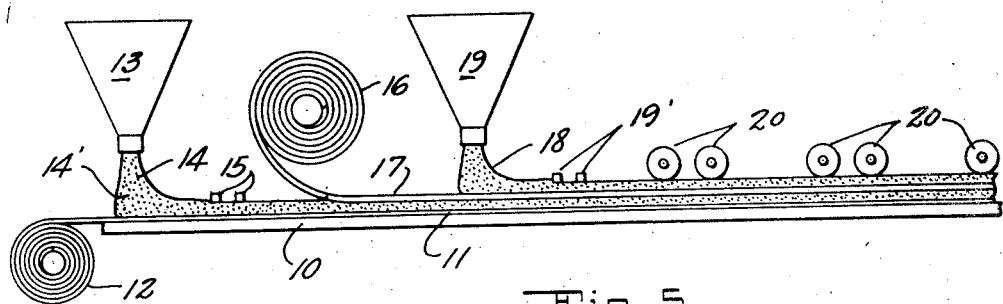
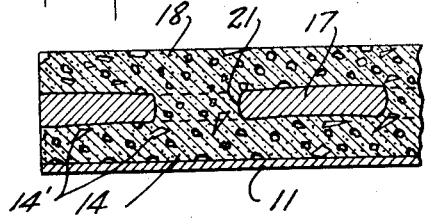
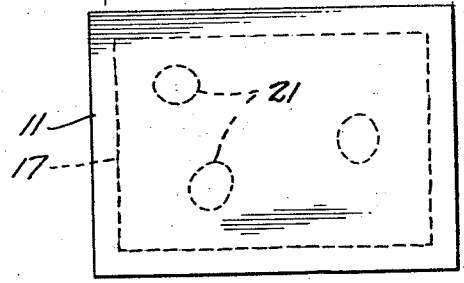
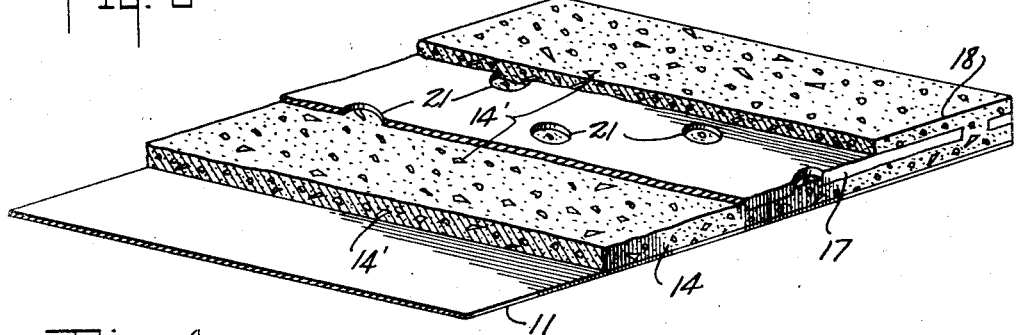
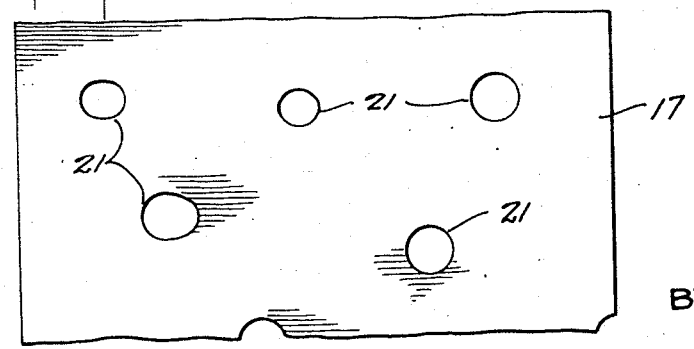
INVENTOR
John H. Delaney
BY John Flam
ATTORNEY Patented Jan. 16, 1934

1,943,757

UNITED STATES PATENT OFFICE 1,943,757

SOUNDPROOF BOARD AND PROCESS OF MAKING SAME

John H. Delaney, Los Angeles, Calif.; Union Bank & Trust Co. of Los Angeles, administrator of said John H. Delaney, deceased, assignor to estate of Ada W. Delaney, deceased Application May 13, 1930. Serial No. 451,975

5 Claims. (Cl. 154—2)

This invention relates to a plaster board; and more particularly to a board adapted for acoustical purposes.

In my Patent No. 1,890,674 for Method of making wall covering, I describe a scheme for manufacturing plaster board, especially a porous plaster which adheres by means of voids formed therein by the effervescence of an effervescing material through the plaster.

In my Patent No. 1,778,008, for Plaster board, I describe the incorporation of a brilliantly reflecting micaceous flake into the plaster produced by the aforementioned application.

It is an object of my invention to combine with a board produced in the manner as set out in the above patents, a yielding sound absorbing material which will prevent any substantial transmission of any sound therethrough, or any reflection thereof.

Due to the present day development of sound films and broadcasting, it is necessary, in order to get a true and undistorted reproduction of the sound, to provide a room with walls which will not reecho any of the sound waves, but will absorb them, and which also acts to shut out exterior noises. I have found that by combining with the porous plaster a material such as hairfelt, balsam wool, rock wool or any other similar substance, I provide a board suitable for a studio room.

It is another object of my invention to provide an acoustical material that presents both a novel and pleasing appearance occasioned by the use of brilliantly reflecting micaceous flakes interspersed in a porous plaster.

My invention possesses many other advantages, and has other objects which may be made more easily apparent from a consideration of one embodiment of my invention. For this purpose I have shown a form in the drawing accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawing:

Figure 1 is a diagrammatic view of the means to produce my sound proof board;

Fig. 2 is a cross section of a board embodying my invention;

Fig. 3 is a pictorial view of the board with parts thereof removed;

Fig. 4 is a plan view of a reticulated fabric or material used in my invention; and Fig. 5 is a plan view of a tile embodying my invention.

In practicing my invention, I employ a binder such as gypsum which, preferably, has incorporated therein a material capable of rendering the gypsum porous, by effervescing. In the preferred form of my invention this material is in the form of granules, as I have found that in effervescing, the granular particles travel through the binder due to the evolution of a gas and render the binder uniformly porous. An example of this effervescing material is aluminum sulphate and calcium carbonate, one of which is in granular form. Bicarbonate of soda may also be used as well as any of the known gas producing substances.

I have found that a porous plaster as above produced has high sound absorbing qualities. Due to the innumerable pores and voids distributed throughout the mass of the board, sound waves, in order to pass through, would be guided by these pores or pockets in a haphazard course dependent on their arrangement. Thus it is apparent that the sound waves would travel in a course many times longer than the thickness of the material, and most of their energy would be expended before they passed through. The path of sound waves would very much resemble the course of a mouse trying to find its way out of a maze. Reflection is thus very greatly hindered.

In order to reduce the weight of my finished product and still retain the strength of a board that is composed entirely of plaster, I incorporate with the plaster an aggregate such as large micaceous flakes. These flakes add to the beauty of the board and give a pleasing appearance thereto due to the colored and reflecting surfaces of the flakes.

Although a porous plaster absorbs sound, I have found that by incorporating in the plaster a soft, feltable, yielding fabric, I provide an additionable damper or sound resistor that gives a result not heretofore achieved. Such materials as hairfelt, balsam wool, or rock wool may be used, although I prefer rock wool due to its fire resisting properties. The material is of considerable thickness and very loosely held together in order to provide pockets for entrapping sound waves to absorb them. In order to insure the retention of this fabric in the plastic mass, I provide a plurality of large holes or keying means therein. These holes are approximately about an inch in diameter.

To produce my board, I provide a base or platform 10 over which a continuous sheet of base material 11, such as cardboard, fibre board, pasteboard, etc., is passed, as from a supply roll 12. From hopper 13 the plastic material or binder 14 including plaster, effervescing material, and micaceous flakes 14', are fed onto the base 11. Leveling bars 15 prevent the excess use of the binder. After the plastic material is fed onto the base, effervescing begins and the material is caused to adhere to the base. The reason for this has been clearly explained in my application, Serial No. 278,537.

From the supply roll 16 the punched-out, reticulated fabric 17 is fed onto the plastic material or binder 14 and then covered by another layer of binder 18, from the hopper 19, similar to hopper 13. This material 17 has the large openings 21. Levelling bars 19' prevent the excess use of this material. The holes 21 in the fabric 17 permit some of the plaster 18 to pass through, thus keying layer 18 with layer 14. The composite material is then fed underneath a series of levelling rollers 20 which tends to maintain a uniform thickness of the material. During all this interval, the effervescing material is continually forming voids and pores in the plaster, and when the composite material leaves the levelling rolls 20, it has a tendency to puff up slightly and thus produce a comparatively high porous structure. This is caused by the bubbles, formed by the effervescing material, rising to the surface.

If it is desired to reinforce the composite board, this may be done by means of a well known reinforcing material, such a scrim or burlap incorporated in the board in a conventional manner.

Although I have described a continuous process of producing a board of stock material, it is often desirable to make tiles, blocks or units of definite dimensions. To do this a base, such as wood, metal, plasterboard, etc., is cut to size and covered with my plaster material and reticulated fabric of a size slightly smaller than the base in a manner already described. By having the fabric slightly smaller than the base, the plaster covers the edges thereof and imparts a smooth finish to the edges of the finished products. This form may be seen in Fig. 5.

It is within the scope of my invention to unite the yielding reticulated material directly to the base without the use of an intervening layer of plaster. I accomplish this by pouring the plaster directly onto the yielding material which is intimately secured to the base by the plaster passing through the holes or keys in a manner above described.

I claim:

1. An acoustic board comprising two layers of plaster, said plaster having solidified gas bubbles interspersed therein, and a layer of yieldable sound absorbing material between said plaster layers, said sound absorbing material being hole punched to provide interlocks for the two plaster layers.

2. An acoustic board comprising a backing, two layers of plaster, one of said layers being formed on said backing, said plaster having solidified gas bubbles interspersed therein, and a layer of yieldable sound absorbing material between said plaster layers, said sound absorbing material being hole punched to provide interlocks for the two plaster layers.

3. An acoustic board for absorbing sound and for reducing echoes, comprising rigid porous plaster exposed to the sound waves, and a layer of yieldable sound absorbing material embedded in said porous material.

4. In an acoustic board, outer layers of porous plaster, and a layer intermediate the outer layers, of yieldable sound absorbing material and in intimate contact with the outer layers.

5. The method which comprises depositing a continuous layer of bubbling plaster in a plastic state, depositing thereover an intermediate yieldable sound absorbing material, while the first layer is plastic, and depositing a continuous covering layer of bubbling plaster over the intermediate layer.

JOHN H. DELANEY.